United States Patent
Dockhorn et al.

(10) Patent No.: US 10,198,436 B1
(45) Date of Patent: Feb. 5, 2019

(54) HIGHLIGHTING KEY PORTIONS OF TEXT WITHIN A DOCUMENT

(71) Applicant: Adobe Systems Incorporated, San Jose, CA (US)

(72) Inventors: Carl Iwan Dockhorn, San Jose, CA (US); Sean Michael Fitzgerald, Campbell, CA (US); Ragunandan Rao Malangully, Milpitas, CA (US); Laurie Marie Byrum, Pleasanton, CA (US); Jason Guthrie Waters, Cupertino, CA (US); Frederic Claude Thevenet, San Francisco, CA (US); Walter Wei-Tuh Chang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/816,473

(22) Filed: Nov. 17, 2017

(51) Int. Cl.
*G06F 17/00* (2006.01)
*G06F 17/28* (2006.01)
*G06F 17/22* (2006.01)
*G06F 17/21* (2006.01)
*G06F 17/30* (2006.01)
*G06F 17/27* (2006.01)

(52) U.S. Cl.
CPC ........ *G06F 17/2836* (2013.01); *G06F 17/212* (2013.01); *G06F 17/2247* (2013.01); *G06F 17/2785* (2013.01); *G06F 17/30719* (2013.01)

(58) Field of Classification Search
CPC ............. G06F 17/2785; G06F 17/3053; G06F 17/30705
See application file for complete search history.

(56) References Cited

U.S. PATENT DOCUMENTS

| 6,820,237 | B1* | 11/2004 | Abu-Hakima | G06F 17/218 715/210 |
| 7,925,993 | B2* | 4/2011 | Williams | G06F 17/241 715/230 |
| 2011/0093520 | A1* | 4/2011 | Doyle | G06F 17/30867 709/203 |
| 2013/0325463 | A1* | 12/2013 | Greenspan | G06F 3/013 704/235 |
| 2014/0013192 | A1* | 1/2014 | McQuiggan | G09B 5/062 715/203 |
| 2014/0143664 | A1* | 5/2014 | Tsang | G06F 17/24 715/256 |
| 2017/0242921 | A1* | 8/2017 | Rota | G06F 17/30625 |
| 2017/0249289 | A1* | 8/2017 | Simske | G06F 17/2264 |

* cited by examiner

*Primary Examiner* — Laurie A Ries
(74) *Attorney, Agent, or Firm* — Wolfe-SBMC

(57) ABSTRACT

Highlighting key portions of text within a document is described. A document having text is obtained, and key portions of the document are determined using summarization techniques. Key portion data indicative of the key portions is generated and maintained for output to generate a highlighted document in which highlight overlays are displayed over or proximate the determined key portions of the text within the document. In one or more implementations, reader interactions with the highlighted document are monitored to generate reader feedback data. The reader feedback data may then be combined with the output of the summarization techniques in order to adjust the determined key portions. In some cases, the reader feedback data may also be used to improve the summarization techniques.

20 Claims, 8 Drawing Sheets

HIGHLIGHTING KEY PORTIONS OF TEXT WITHIN A DOCUMENT

BACKGROUND

Some conventional automatic summarization techniques can automatically create a summary of a document which includes important sentences and phrases from the document. Users can then view the summary in order to quickly learn what the document is about without reading the entire document. However, creating a summary that is separate from the document itself carries a high risk if it is wrong. For example, failure to include an important sentence in a summary may completely alter the user's understanding of the document because the user is not presented with all of the important information. As such, failure to include even one important sentence may greatly decrease the accuracy of the summary. Furthermore, because such summaries are often read instead of the document itself, errors in the summary may not be detected.

SUMMARY

To overcome these and other problems in document summarization, key portions of text within a document are highlighted within the document in a digital medium environment. Initially, digital content corresponding to a document having text is obtained, and key portions of the document are determined using summarization techniques. Generally, the key portions correspond to sentences or phrases of the document with a high relative importance to the document. Instead of using the determined key portions to generate a summary or abstract separate from the document itself, key portion data indicative of the key portions is generated and maintained for output to generate a highlighted document in which highlight overlays are displayed over or proximate the determined key portions of the text within the document.

In one or more implementations, reader interactions with the highlighted document are monitored to generate reader feedback data. The reader feedback data, for example, may include positive or negative reader feedback regarding the key portions highlighted in the document, reader suggestions to highlight other portions of the document which are not currently highlighted, or reader behavior corresponding to time spent reading certain areas of the document. The reader feedback data may then be combined with the output of the summarization techniques in order to adjust the determined key portions. Doing so causes the highlighted key portions in the document to change dynamically as readers interact with the highlighted document. For example, a key portion of a document may be removed based on negative reader feedback data regarding the key portion, or a currently un-highlighted portion of the document may be highlighted as a key portion based on a reader suggestion to highlight the un-highlighted portion of the document.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
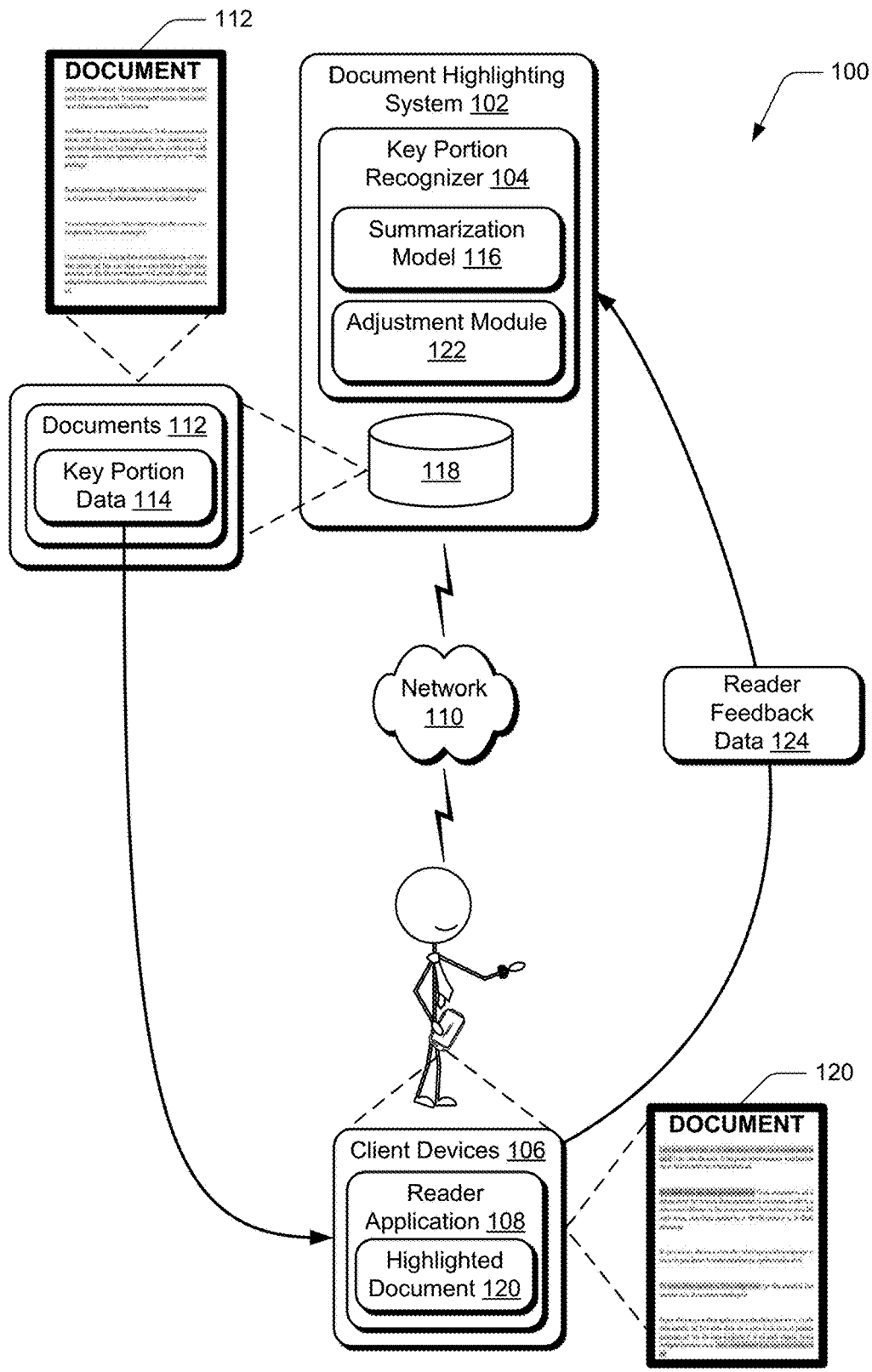
FIG. 1 is an illustration of an environment in an example implementation that is operable to employ techniques described herein.

Increasingly, readers rely on a summary of a document in order to quickly learn what the document is about or identify important information within the document. Summarization techniques can be configured to create such summaries automatically by identifying and extracting important sentences from the document, and then presenting the extracted sentences separate from the text of the document. However, conventional summarization techniques have a high cost when they are wrong. For example, if an automatically generated summary fails to include a crucial sentence from the document, the reader will be unable to determine that the document includes this sentence unless the user reads the original document in its entirety. As such, failure to include even one important sentence may greatly decrease the accuracy of the summary. Furthermore, existing techniques create static summaries, and thus fail to provide a mechanism to modify the summaries to include important information that is not originally identified and included in the summary.

To overcome these problems, a summarization model applies summarization techniques to a document having text to recognize key portions of the document, such as key sentences, key phrases, or key words. The summarization techniques may correspond to machine learning summarization techniques, rule-based summarization techniques, or a combination thereof. The key portions correspond to sentences or phrases of the document with a high relative importance to the document. Key portion data indicative of the key portions is generated and associated with the document. Instead of using the determined key portions to generate a summary or abstract separate from the document, the key portion data is maintained for output to form a highlighted document in which the key portions are highlighted or otherwise identified within the document by highlight overlays displayed over or proximate each key portion. Doing so enables the reader to view the key portions of the document within the document itself by scrolling between the highlighted key portions which reduces the risk that a key portion will be shown out of context or that important information, not identified by the summarization techniques, will be missed by the reader. Identifying the key portions within the document also improves the reading comprehension and efficiency of the reader by providing an outline of the key portions within the document.

In one or more implementations, the accuracy and relevance of the determined key portions is further improved by biasing the output of the summarization techniques with captured reader feedback data. The described techniques provide a platform for readers to provide feedback or suggestions regarding the key portions identified within the highlighted document. If the summarization techniques erroneously highlighted a key portion, the platform enables readers to simply click to remove the highlight. Similarly, the reader can provide positive feedback regarding a selected highlight in order to reinforce the highlighted key portion, and if the summarization techniques omitted a key portion, the reader can highlight the portion as important. Reader feedback data is generated based on the reader interactions, and the reader feedback data is communicated back to the summarization model which uses the reader feedback data to adjust the identified key portions, such as be adding or removing key portions identified within the highlighted document. In this way, the highlighted key portions change and improve dynamically as readers interact with the highlighted document. Additionally, the reading feedback data enables the summarization model to learn and improve from each document with human feedback, which is missing from conventional summarization models.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a document highlighting system 102 with a key portion recognizer 104 and multiple client devices 106 with a reader application 108. The document highlighting system 102 and the multiple client devices 106 are communicatively coupled, one to another, via a network 110.

Computing devices that are usable to implement the document highlighting system 102 and client devices 106 may be configured in a variety of ways. A computing device, for instance, may be configured as a desktop computer, a laptop computer, a mobile device (e.g., assuming a handheld configuration such as a tablet or mobile phone), and so forth. Thus, computing devices may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 8.

As noted above, the document highlighting system 102 is illustrated as including a key portion recognizer 104 that is implemented at least partially in hardware of one or more computing devices of the document highlighting system 102. The key portion recognizer 104 is representative of functionality to recognize key portions of text within a document 112, and to generate key portion data 114 representative of the determined key portions. In some cases, the key portion recognizer 104 is configured to generate key portion data 114 for multiple documents. For example, the key portion recognizer 104 may generate the key portion data for a series of chronological documents 112. The key portion data 114 is associated with a respective document 112 and includes identifiers or tags of the determined key portions of text within the document. As described herein, the determined key portions can include key words, key sentences, and/or key phrases within the text of the document 112.

Key portion recognizer 104 includes a summarization model 116 which is representative of functionality for using machine learning and/or rule-based summarization techniques to automatically determine key portions of text within a document 112 which contain the most important information in the document. For example, the summarization model 116 may be implemented as a machine learning extractive summarization algorithm which identifies and selects a subset of existing words, phrases, or sentences in the original text of a document to form a summary of the document. Alternately, the summarization model 116 may be implemented as an abstractive summarization algorithm which builds an internal semantic representation of the document 112, and then use natural language generation techniques to create a summary that is closer to what a human might express.

Unlike existing summarization techniques which generate a summary that is separate from the document itself, the key portion recognizer 104 employs the summarization model 116 in order to recognize the key portions, and then generates key portion data 114 which includes identifiers of the key portions within the respective document. The key portion data 114 may be maintained in a storage 118 of the document highlighting system 102, and configured for output to generate a highlighted document in which highlight overlays are displayed over or proximate the determined key portions of the text of the original document. Thus, rather than generating a separate summary, the highlight overlays identify the recognized key portions within the original text of the document.

The reader application 108 is representative of functionality to display digital content corresponding to a highlighted document 120 at client device 106. "Digital content" may refer to a variety of different types of digital content, such as documents and text or images within a document, images, video, sound, and so on. Accordingly, digital content may be created to describe a variety of visual, audio, and/or haptic characteristics, such as text in a document, highlight overlays or objects to be included in a digital document, a general look and feel of a document, and so forth.

The reader application 108 may be implemented in a variety of different ways, including as a standalone application (e.g., a PDF reader), a web application running in a web browser, or an extension or plugin (e.g., a plugin for a web browser), to name just a few. The highlighted document 120 includes digital content corresponding to the text of the original document 112 as well as additional digital content corresponding to highlight overlays indicative of the key portions of the document recognized by the key portion recognizer 104. To form the highlighted document 120, the reader application 108 obtains the key portion data 114 associated with a respective document 112 from the document highlighting system 102. In some cases, the document 112 is opened locally at the client device 106, such as by opening a document stored on client device 106 or browsing to a remote website containing a web page or article. In these scenarios, an identifier of the document 112 is communicated to the document highlighting system 102. The document highlighting system 102 then communicates the key portion data 114 corresponding to the identifier of the document to the client device 106 via network 110. Alternately, in some cases the key portion data 114 may be stored with the document 112 itself. The key portion data 114 is usable by the reader application 108 to identify the portions of text within the document 112 which correspond to the key portions. The reader application 108 then displays digital content corresponding to the text of the document 112 along with additional digital content corresponding to highlight overlays which identify the key portions within the document.

Key portion recognizer 104 is further illustrated as including an adjustment module 122 which is representative of functionality to adjust or modify the output of the summarization module 116 based on reader feedback data 124 obtained from client devices 106. For example, in addition to displaying the highlighted document 120, the reader application 108 may include functionality to monitor reader interactions with the highlighted document 120, and to generate the reader feedback data 122 based on the reader interactions. The reader feedback data 124, for example, may include indications of the amount of time readers spend reading particular portions of the highlighted document, positive or negative feedback regarding the key portions highlighted within the document, or suggestions to identify particular portions of the document, which are currently not highlighted, as a key portion, to name just a few. The adjustment module 122 uses the reader feedback data 124 to improve the accuracy and relevance of the determined key portions by adjusting the output of the summarization model 116 with the captured reader feedback data 124, such as by adding or removing key portions identified in the highlighted document 120.

Although illustrated as being implemented remote from client devices 106, functionality of the illustrated document highlighting system 102 may also be implemented in whole or part locally at the client devices 106. For example, the key portion recognizer 104 can be implemented to identify key portions within a document and generate the highlighted document locally at the client device 106. In some cases, for privacy configurations, the key portion recognizer 104 can also be controlled to disable the communication of reader feedback data 124 over the network 110. This may be important for readers in highly secure environments in order to generate highlighted documents without communicating or receiving data over the network 110.

Operation of the key portion recognizer 104 and the reader application 108 is described in greater detail in relation to FIGS. 2 and 3 in the following description and as shown in the example highlighted document of FIG. 4.

Determining Key Portions of Text within a Document

Figure 2:
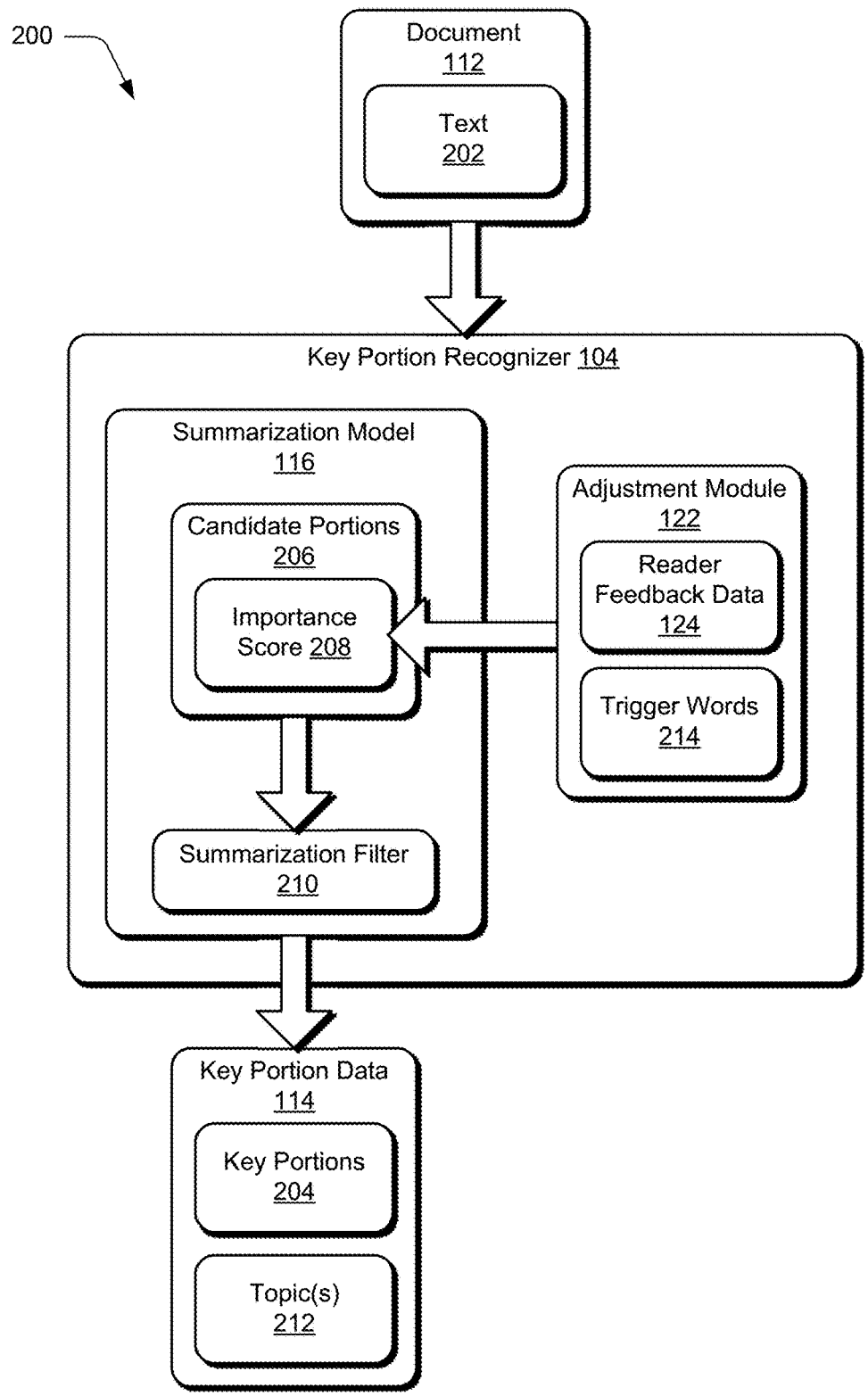
FIG. 2 depicts a system in an example implementation in which a key portion recognizer determines key portions of text within a document using summarization techniques.

FIG. 2 depicts a system 200 in an example implementation in which a key portion recognizer determines key portions of text within a document using summarization techniques.

In system 200, the key portion recognizer 104 obtains text 202 of a document 112. Document 112 may include any type of document or content with text, such as web pages, PDFs, or word processing documents, to name just a few. In some cases, a text conversion module (not pictured) of the key portion recognizer 104 is used to convert the text 202 of the document 112 into a format that is readable by the summarization model 116, such as by converting a web page or PDF into readable text.

Next, the key portion recognizer 104 provides the text 202 to the summarization model 116. The summarization model 116 applies machine learning and/or rule-based summarization techniques to the text 202 to determine key portions 204 of the text 202 of document 112. The key portion recognizer 104 may utilize a variety of different machine learning or rule-based summarization techniques to determine the key portions 204, including extractive or abstractive summarization techniques. In some cases, the key portion recognizer 104 may utilize a domain-dependent summarizer which is specifically configured to summarize a particular type of document. For example, the key portion recognizer 104 may utilize a first summarizer for articles, a second summarizer for legal documents, and so forth. In some cases, the key portion recognizer 104 may use ensemble techniques in order to aggregate highlights coming from multiple different summarizers.

In one or more implementations, the summarization model 116 uses extractive summarization techniques to determine the key portions 204. The summarization model 116 can be utilized to use any type of extractive summarization techniques to determine the key portions 204. However, in some cases, the extractive summarization techniques determine the key portions 204 based on an importance score indicating a relative importance of the key portion to the document. To determine key portions using extractive summarization techniques which determine importance scores, the summarization model 116 first identifies candidate portions 206 of text 202 of the document using natural language processing techniques. Each candidate portion 206 may correspond to a sentence within the text 202 of document 112, or in some cases just a portion of a sentence within the text 202. For example, the natural language processing techniques can segment the document 112 into the candidate portions 206 and tokenize each candidate portion.

Next, for each of the candidate portions 206, the summarization model 116 generates an importance score 208 indicating a relative importance of the respective candidate portion 206 to the document 112. The importance scores, by way of example, may provide a score indicative of the relative importance of the candidate portion 206 to document 112 on a scale of 0 to 1, where a score of 1 indicates that the candidate portion 206 is very important to the document 112, whereas a score of 0 indicates that the candidate portion 206 is not important to the document. However, a variety of different types of importance scores or weights can be generated for the candidate portions without departing from the spirit or scope of the described techniques.

The importance scores 208 can be generated based on a frequency of key terms within each respective candidate portion 206. For example, the summarization model 116 may use term frequency-inverse document frequency (TF-IDF) to determine the importance scores 208. TF-IDF is a numerical statistic which reflects a relative importance of a term to an entire document. The TF-IDF value increases proportionally to the number of times a term appears in the document, but is often offset by the frequency of the term in a corpus, which helps to adjust for the fact that some terms appear more frequently in general.

The summarization model 116 may use TF-IDF to determine a ranked list of key terms, and then determine importance scores 208 based on a frequency of highly ranked terms in the candidate portion. For example, the summarization model 116 will determine a high importance score 208 for a candidate portion 206 that includes multiple highly ranked key terms. In some cases, the candidate portions 206 can then be ranked or prioritized in a list, such that the candidate portions with the highest importance scores are listed at the top of the list.

The summarization model 116 determines the key portions 204 by selecting a subset of the candidate portions 206. To do so, the summarization model 116 utilizes a summarization filter 210 to select a subset of the candidate portions as the determined key portions based on the importance score of each respective candidate portion. In some cases, criteria other than the importance score may be used to select the candidate portions, such as a topic of candidate portions. The summarization filter 210 selects a certain percentage of the candidate portions with the highest importance scores as the key portions. The summarization filter 210 may be configured to select a small overall percentage of candidate portions as the key portions (e.g., less than 10%) such that the determined key portions 204 include a small amount of text relative to the total amount of text in the document 112. In some cases, the percentage may be increased or decreased based on other factors, such as the type of the document 112, the size of the document 112, or user input to specify the percentage of the document to be highlighted.

Key portion data 114 indicative of the determined key portions 204 is maintained for output to generate the highlighted document 120 in which highlight overlays are displayed over the determined key portions 204 of the text 202. For example, the key portion data 114 may include identifiers or pointers to various sentences, phrases, or words within the document 112 which are determined to be key portions 204 by the summarization model 116. In some cases, the key portion data 114 may include additional data usable to form the highlighted document. For example, the key portion data may include an indication of the importance score associated with each key portion which can be used to display a highlight overlay with additional emphasis over key portions with the highest importance to the document. In some cases, the summarization model 116 is further configured to determine topics 212 of the document 112 and maintain the topics 112 with the key portions 204 in the key portion data 114. The topics 212 can be utilized by the reader application 108 to filter the highlights that are displayed to the reader, as will be discussed in more detail below with regards to FIGS. 3 and 4.

Displaying Highlight Overlays to Identify Key Portions of Text

Figure 3:
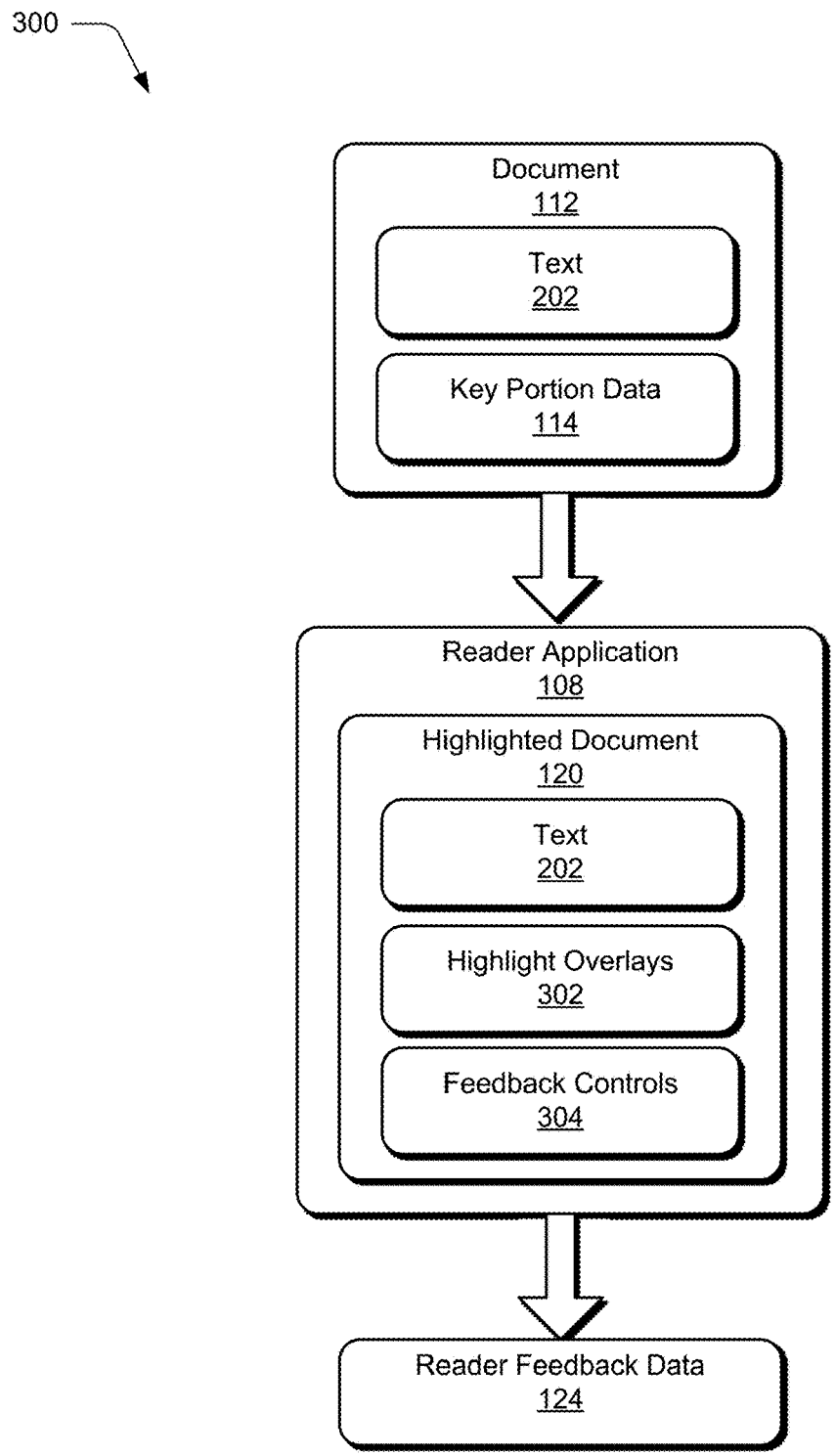
FIG. 3 depicts a system in an example implementation in which a reader application displays highlight overlays indicating key portions of text within a document.

FIG. 3 depicts a system 300 in an example implementation in which a reader application displays highlight overlays indicating key portions of text within a document.

In system 300, reader application 108 obtains document 112 along with key portion data 114. In some cases, the document 112 is opened locally at the client device 106, such as by opening a document stored on client device 106 or browsing to a remote website containing a web page or article. In these scenarios, an identifier of the document 112 is communicated to the document highlighting system 102. The document highlighting system 102 then communicates the key portion data 114 corresponding to the identifier of the document to the client device 106 via network 110. Alternately, in some cases the key portion data 114 may be stored with the document 112 itself. The reader application 108 then forms a highlighted document 120 by displaying digital content corresponding to the text 202 of the document 112 and additional digital content corresponding to highlight overlays 302 on a display device of a client device 106. The highlight overlays 302 identify the key portions within the document 112 indicated by the key portion data 126. The highlight overlays 302 may identify the key portions within the document in a variety of different ways, such as by highlighting, underlining, bolding, or italicizing the text of the document which corresponds to the key portions.

Figure 4:
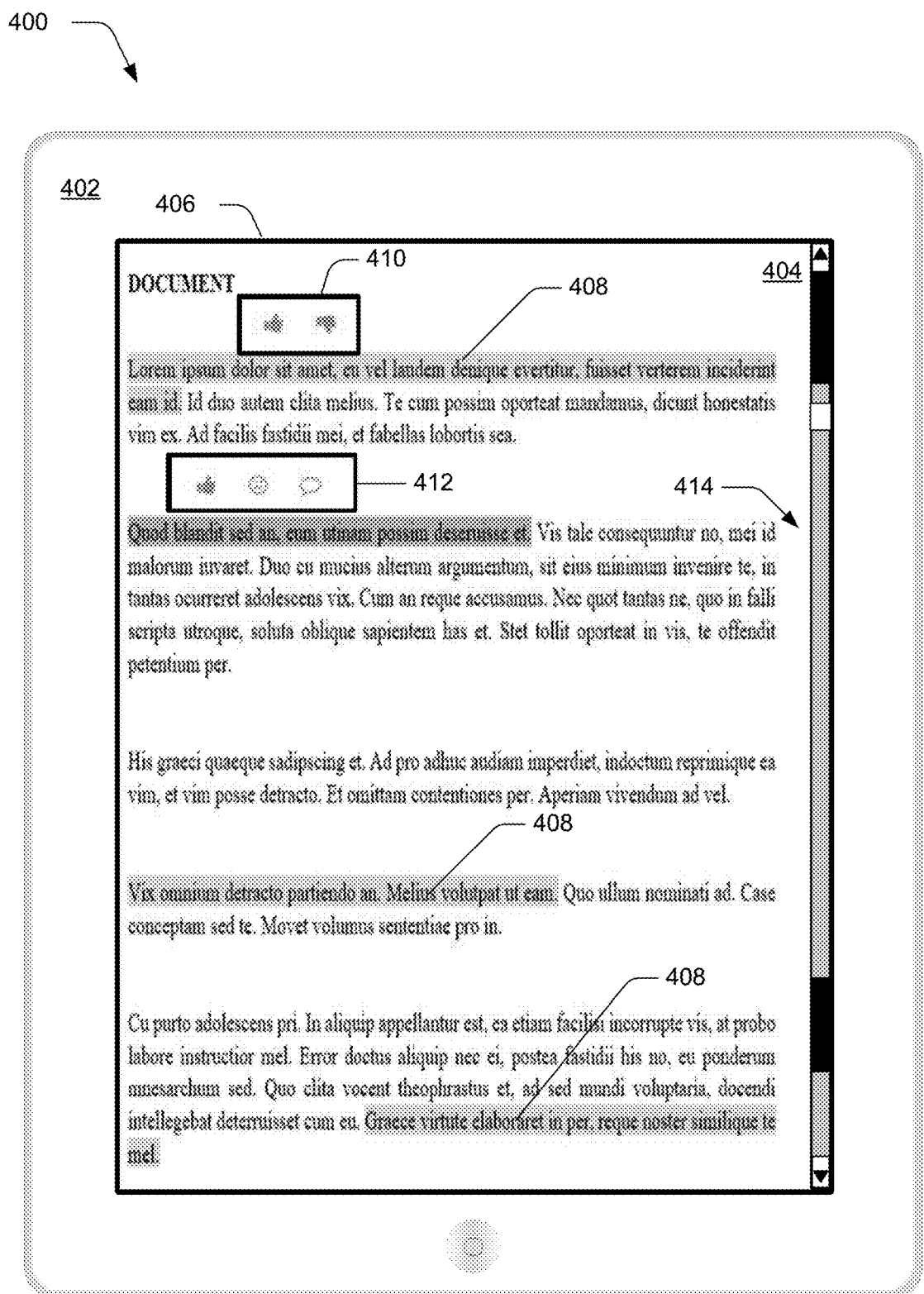
FIG. 4 illustrates an example of a reader application displaying a highlighted document with highlight overlays indicating key portions of text within the document.

As an example, consider FIG. 4 which illustrates an example 400 of a reader application displaying a highlighted document with highlight overlays indicating key portions of text within the document. In example 400, a client device 402, illustrated as a tablet computing device, executes a reader application 108 which displays digital content corresponding to a page of a highlighted document 404 on a display 406 of the client device. The highlighted document 404 includes text as well as highlight overlays 408 over various key portions of the text. The highlight overlays 408, in this example, highlight the text in a particular color, such as gray or yellow, and also cause the text of the key portion to be bolded. As described throughout, however, the reader application 108 can display the highlight overlays 408 in a variety of different ways.

Notably, highlighting the key portions of text within the document 112 itself enables the reader to view the context of the text of the document itself while reading the key portions, instead of reading a separate summary or abstract in which the context of the document is missing. For example, the reader can read the key portion "Lorem ipsum dolor sit amet, eu vel laudem denique evertitur, fuisset verterem inciderint eam id", which in this example represents a key portion of text, while also being able to read sentences immediately before or after this key portion to gain context for the highlighted key portion.

The reader application 108 may be implemented to display different types of highlight overlays 302 (e.g., different colors) for different types of key portions. For example, the reader application 108 may identify key portions of text within the document 112 using highlight overlays of a first color (e.g., yellow), and identify the most important portions of the document using a second color (e.g., red). Alternately or additionally, the reader application 108 may display different types of highlight overlays to distinguish key portions based on other criteria, such as to distinguish key portions determined by the summarization model 116 from key portions determined from reader feedback, or to distinguish key portions based on topic. Notably, a variety of different types of highlight overlays can be used to indicate a variety of different types of key portions without departing from the spirit or scope of the described techniques.

In many cases the reader application 108 highlights key portions corresponding to complete sentences within the document. However, the reader application 108 can also be implemented to identify portions of sentences, such as a word or phrase of a sentence. For example, the reader application 108 can highlight just nouns or verbs within a key sentence to provide emphasis on an important word or phrase of the key portions. This reduces the total amount of highlighting in the document, while causing the reader to focus on specific words or phrases within important sentences.

In one or more implementations, the reader application 108 can filter the displayed highlight overlays 302 based on reader input to view key highlight overlays corresponding to one or more selected topics or key terms. To do so, the reader application 108 can display a topic control (not pictured) listing one or more topics or key terms associated with the document 112 based on the determined topics 212 identified in the key portion data 114. The reader can then select one or more of the topics or key terms from the topic control in order to filter the highlighted key portions based on the selected topic or key term. For example, in response to receiving reader input to select a topic from the topic control, the displayed highlights are filtered by removing the display of highlight overlays associated with topics which are not selected. In this way, the reader application 108 enables the reader to toggle on or off the highlights for various topics identified in the document 112.

Alternately or additionally, the reader application 108 can employ natural language processing techniques to determine one or more topics of interest to a reader based on a reader query. The reader application can then filter the displayed highlight overlays 302 based on the determined one or more topics of interest. Consider, for example, an article about the Olympics. In this example, the reader can type "I am interested in learning about swimming in the Olympics". The reader application can then use natural language processing to determine topic of interest to the reader, which is swimming in this example. The highlight overlays 302 are then filtered to show only the key portions associated with the topic "swimming".

Reader Feedback Data

In one or more implementations, the reader application 108 is configured to monitor reader interactions with the highlighted document 120, and to generate reader feedback data 124 based on the reader interactions. The reader application 108 provides a platform for readers to easily provide feedback regarding the key portions highlighted in the document by displaying digital content corresponding to various feedback controls 304 with the display of the highlighted document. Generally, the feedback controls 304 enable the reader to provide positive or negative feedback regarding key portions of the text identified by the highlight overlays 302 within the document. The reader feedback data 124 can then be generated based on reader input to the feedback controls 304.

In example 400, the reader application 108 causes display of digital content corresponding to a feedback control 410 proximate the highlight overlay 408 indicating the key portion of text "Lorem ipsum dolor sit amet, eu vel laudem denique evertitur, fuisset verterem inciderint eam id". The feedback control 410, in this instance, may be displayed in response to touch input to the highlight overlay 410 or moving a cursor proximate the highlight overlay 408. Feedback control 410 includes a selectable up-vote and down-vote control enabling the reader to provide positive or negative feedback, respectively, regarding the key portion of text identified by the highlight overlay 408.

In addition, the reader application 108 may enable the reader to suggest portions of the text of the document 112, which are not yet highlighted, as a key portion in the document. For example, the reader application 108 may enable the reader to select or highlight a currently unhighlighted portion of the text in order to suggest that the selected portion be identified as a key portion. In FIG. 4, for instance, the reader manually highlights the text "Quod blandit sed an, eum utinam possim deseruisse et". In response to the highlighting, the reader application 108 causes display of additional digital content corresponding to a feedback control 412 proximate the selected text. The feedback control 412 includes a selectable up-vote control, a confused control, and a comment control. The up-vote control enables the reader to provide feedback indicating that the selected text should be identified as a key portion, the confusion control enables the reader to indicate that the selected text is confusing, and the comment control enables the user to provide a comment regarding the selected text. In example 400 the various feedback controls are shown as being displayed within the document proximate to text, but in other cases such feedback controls can be displayed at other areas of the reader application interface, such as at a fixed menu bar location of the reader application interface. The reader application 108 may provide a variety of different types of feedback controls to the reader without departing from the spirit and scope of the described techniques.

The reader application can generate the reader feedback data 124 based on reader input and selection of the various feedback controls 304. For example, reader input to up-vote or down-vote a highlighted portion causes the reader application 108 to generate positive or negative reader feedback data 124, respectively. The reader application 108 can also generate reader feedback data 124 based on reader interactions with the highlighted document other than input to the feedback controls. Such reader interactions, for example, may include monitoring an amount of time readers spend focusing on particular portions of the document. This can be determined in a variety of different ways, such as by tracking cursor or scrolling movement while a reader reads the document, tracking text copied or selected, tracking the reader's gaze, and so forth.

The reader feedback data 124 is then communicated from instances of the reader application 108, at various client devices, to the key portion recognizer 104. The reader feedback data 124 includes an identifier of the associated document which enables the key portion recognizer 104 to associate the reader feedback data 124 with the corresponding document, and aggregate the reader feedback data 124 with other reader feedback data 124 associated with the document received from multiple instances of the reader application 108 implemented at various client devices 106.

The document highlighting system 102 is configured to adjust the determined key portions of text based on the reader feedback data 124. Returning to FIG. 2, the adjustment module 122 can adjust the determined key portions based on the reader feedback data 124 associated with the respective document 112. The adjustment module 122 adjusts the determined key portions 204 by biasing the output of the summarization model 116 with the reader feedback data 124 in order to cause the summarization model 116 to add or remove the determined key portions 204.

In one or more implementations, the adjustment module 122 modifies the importance scores 208 of the candidate portions 206, which in turn affects the key portions 204 which are selected by the summarization filter 210. For example, if the reader feedback data 124 indicates that a number of readers find a candidate portion 206 to be important, then the importance score 208 for the candidate portion is increased which may cause the candidate portion to be selected as a key portion 204 by the summarization filter 210. In FIG. 4, for instance, if the reader up-votes the text "Quod blandit sed an, eum utinam possim deseruisse et", this may cause the adjustment module 122 to cause this portion of text to be identified as a key portion 204. Of course, whether or not the adjustment module 122 adjusts the identified key portions is based on the number of readers that provide the same or similar feedback. In other words, feedback from a single reader may not cause an adjustment, whereas the same or similar feedback from 100 readers is likely to cause the adjustment.

Similarly, if the reader feedback data 124 indicates that a number of readers find a key portion 204 to be not important, then the importance score 208 for the candidate portion is decreased which may cause the summarization filter 210 to de-select the portion as a key portion. In FIG. 4, for instance, if the reader down-votes the highlighted key portion of text "Lorem ipsum dolor sit amet, eu vel laudem denique evertitur, fuisset verterem inciderint eam id", this may cause the adjustment module 122 to cause this key portion of text to be removed. Thus, unlike conventional document summaries which are static, the described techniques dynamically adjust the determined key portions in order to improve the accuracy and relevance of the determined key portions 204 based on the reader feedback.

In one or more implementations, the reader application 108 may be further implemented to display user interface elements to indicate relative amounts of time readers spend reading various areas of the document. This can be determined based on the reader feedback data 124. In FIG. 4, for example, the reader application 108 presents a heat map 414 as part of the scrollbar. The heat map uses color coding to indicate which portions of the document are most important based on reader interactions with the document. In this example, darker colors (e.g., black) are used to indicate the most areas of the document that readers spent the most time reading, while lighter colors (e.g., gray) are used to indicate areas of the document that readers spent less time reading. The heat map 414 can be shared with all readers of the document 112 to enable readers to quickly scroll to areas of the document that other readers found useful or interesting.

The adjustment module 122 may use data other than the reader feedback data 124 to adjust the output of the summarization model 116. In one or more implementations the adjustment module 122 adjusts the determined key portions based on whether a candidate portion includes one or more trigger words 214. As described herein, trigger words 214 include various words that often are included in important or interesting sentences within a document and thus provide a linguistic cue that the sentence is important. Such trigger words 214, for example, may include conjunctions, which includes the words "but", "also", however", and "nevertheless", to name just a few. The trigger words 214 may also include prepositions, which includes the words "on", over", and "from", to name just a few. Thus, if a candidate portion includes a trigger word 214, the adjustment module 122 may cause the importance score 208 for the candidate portion 206 to be increased thereby causing the summarization filter 210 to select the candidate portion as a key portion 204.

In one or more implementations, the reader feedback data 124 is used by the document highlighting system 102 to improve and refine summarization model 116. The document highlighting system 102 receives reader feedback data 124 associated with multiple different documents 112 from multiple instances of the reader application 108 implemented at various client devices 106. The document highlighting system 102 can then use the reader feedback data 124, received for all documents in the system, as training data in order to improve the summarization model 116. For example, positive reader feedback regarding key portions determined by the summarization model 116 indicates that the summarization model 116 correctly determined the key portion, whereas negative reader feedback may indicate that the summarization model 116 incorrectly determined the key portion. Thus, machine learning and/or deep learning techniques can be applied to the reader feedback data 124 to improve and refine the various rules of the summarization model 116. Notably, the feedback platform described herein makes it very easy for readers to provide feedback, which ensures that a large amount of feedback data will be received. For example, as discussed throughout, the platform makes it very easy for readers to reinforce a highlight, suggest removal of a highlight, or suggest a new highlight be added. This means that the document highlighting system will receive a large amount of reading feedback data which can be used to create a large training data set.

As discussed above, in some cases, the key portion recognizer may use ensemble techniques to aggregate reader feedback received from multiple different types of summarizers. The adjustment module 122 can be configured to train these ensemble techniques based on the reader feedback by giving more weight to summarizers which tend to agree more often with users.

Having discussed example details of the techniques for highlighting key portions of text within a document, consider now some example procedures to illustrate additional aspects of the techniques.

Example Procedures

This section describes example procedures for highlighting key portions of text within a document in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 5:
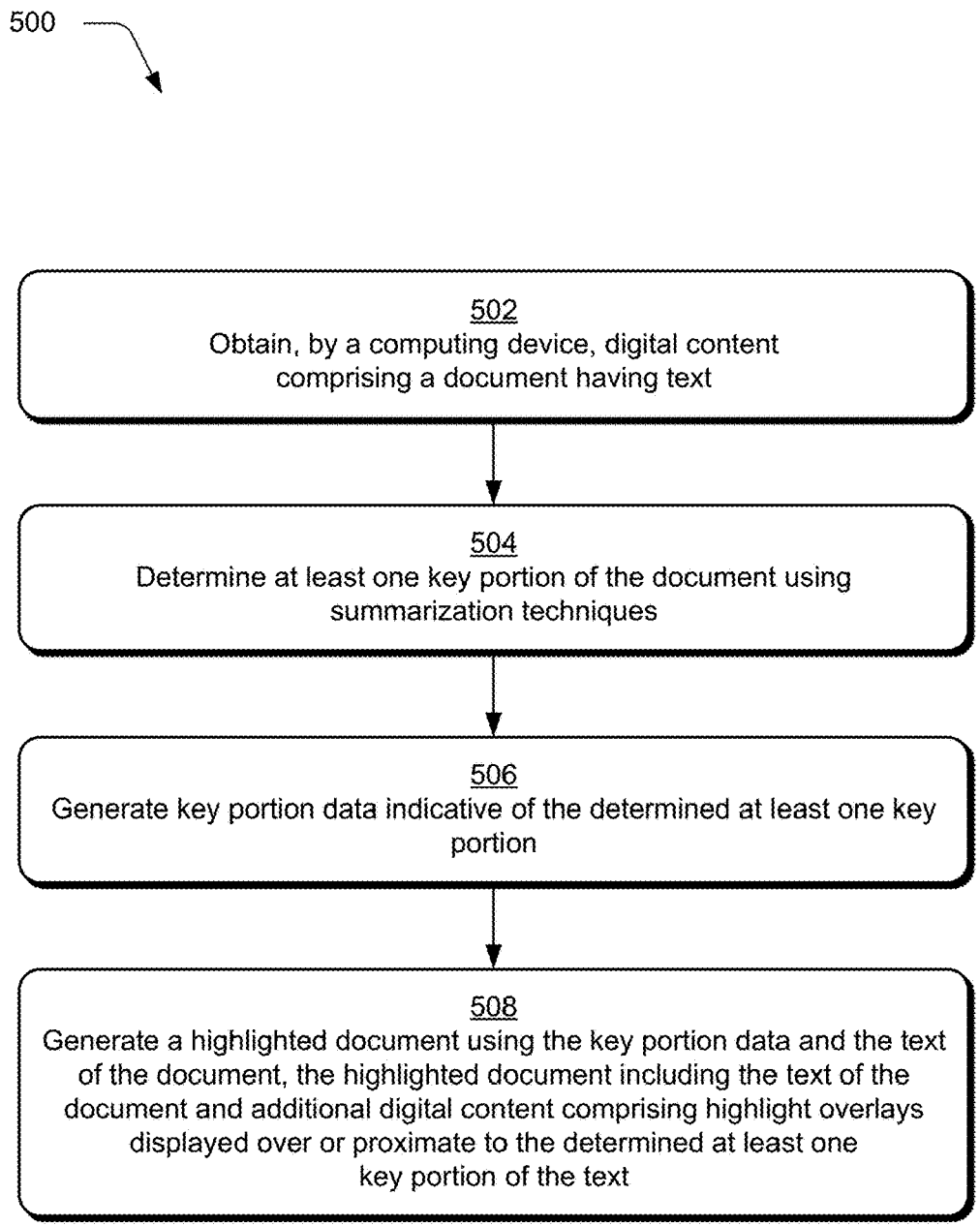
FIG. 5 depicts an example procedure in which key portions of text within a document are determined.

FIG. 5 depicts an example procedure 500 in which key portions of text within a document are determined. Initially, digital content comprising a document having text is obtained by a computing device (block 502). By way of example, the key portion recognizer 104 obtains a document 112 having text 202.

At least one key portion of the text of the document is determined using summarization techniques (block 504). As discussed above, the key portion recognizer 104 applies a summarization model 116 to the text 202 of the document. The summarization model 116 determines candidate portions 206 (e.g., sentences or phrases) within the document 112. Next, the summarization model 116 determines an importance score 208 based on a frequency of key terms within each of the candidate portions 206. A summarization filter 210 of the summarization model 116 selects a subset of the candidate portions 206 as the determined key portions 204. For example, the summarization filter 210 may select the candidate portions with the highest importance scores 208. The summarization filter 210 is designed to select a small percentage of the total text of the document as the key portions 204 (e.g., less than 10%). However, in some cases this percentage may be increased or decreased based on the type of document or the size of the document or other factors.

Key portion data indicative of the determined at least one key portion is generated (block 506), and a highlighted document is generated using the key portion data and the text of the document. The highlighted document includes additional digital content comprising highlight overlays displayed over or proximate to the determined at least one key portion of the text (block 508). By way of example, the key portion recognizer 104 generates key portion data 114 indicative of the determined key portions 204, and maintains the key portion data for output to generate a highlighted document 120 in which additional digital content corresponding to highlight overlays 302 is displayed over the determined key portions of the text.

Figure 6:
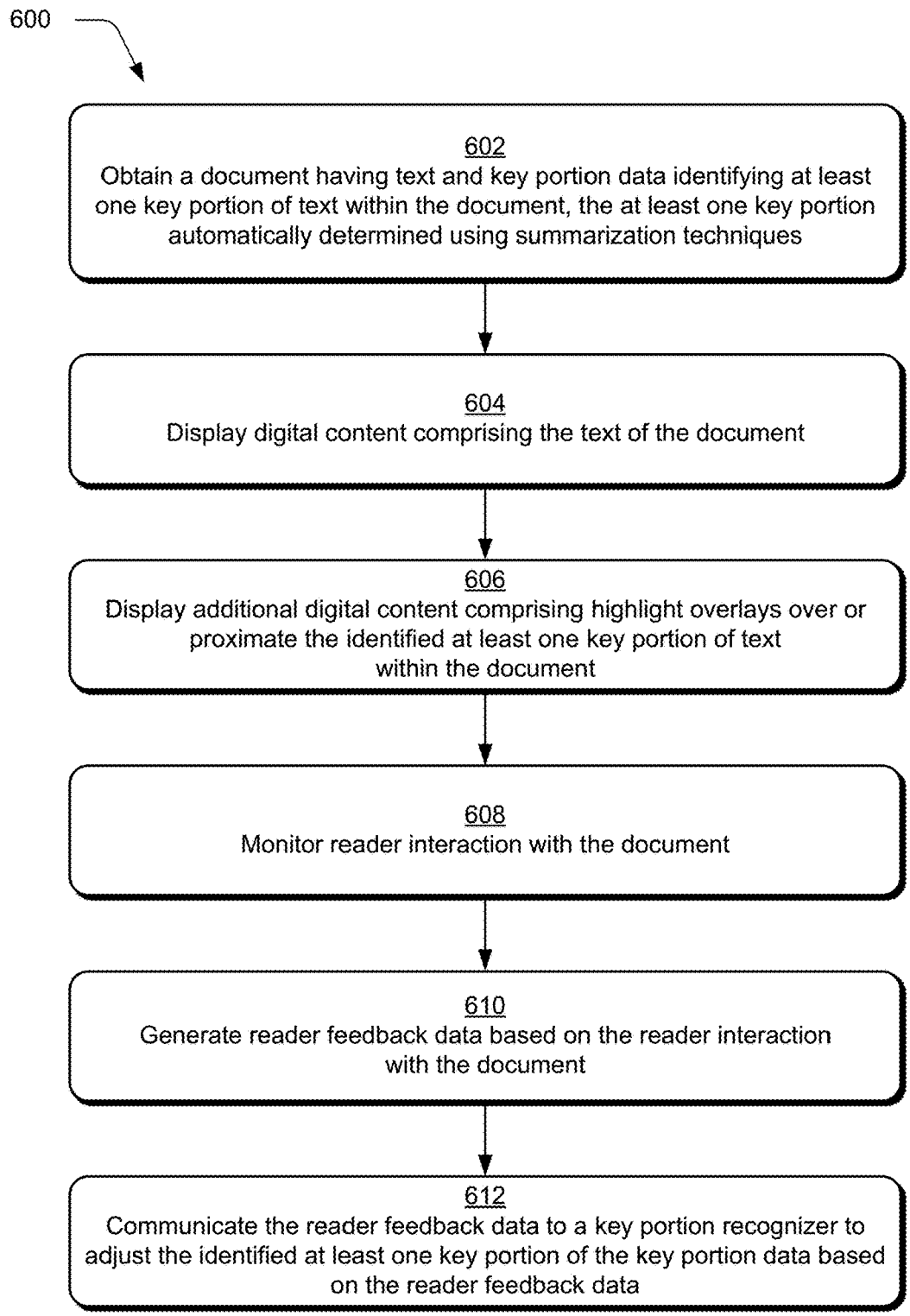
FIG. 6 depicts an example procedure in which key portions of text are highlighted within a document.

FIG. 6 depicts an example procedure 600 in which key portions of text are highlighted within a document. Initially, a document having text and key portion data identifying at least one key portions of text within the document is obtained (block 602). The key portions are automatically determined using summarization techniques. By way of example, the reader application 108 obtains a document 112 having text 202 and key portion data 114 identifying one or more key portions 204 of text within the document 112 from the key portion recognizer 104. The key portions are automatically determined by the key portion recognizer 104 applying the summarization model 116 to the document 112.

Digital content comprising the text of the document is displayed (block 604) and additional digital content comprising highlight overlays is displayed over or proximate the identified at least one key portions of text within the document (block 606). By way of example, the reader application 108 displays a highlighted document 120 which includes digital content comprising the text 202 of the original document 112 and highlight overlays 302 over or proximate the identified key portions 204.

Optionally, at blocks 608 and 610, reader interaction with the document is monitored (block 608), and reader feedback data is generated based on the reader interaction with the document (block 610). The reader feedback data can then be communicated to a key portion recognizer to adjust the identified at least one key portion of the key portion data based on the reader feedback data (block 612). By way of example, the reader application 108 monitors reader interactions with the highlighted document 120, and generates reader feedback data 124 based on the reader interactions. The reader feedback data may then be provided to the key portion recognizer 104 to enable the key portion recognizer 104 to adjust the identified key portions 204 of the key portion data 114.

In some cases, the reader application 108 provides a platform for readers to provide feedback regarding the key portions 204 highlighted in the document 112 by displaying various feedback controls 304. Generally, the feedback controls 304 enable the user to provide positive or negative feedback regarding key portions of the text identified by the highlight overlays 302. In addition, the reader application 108 may enable the reader to suggest key portions which are not yet highlighted within the document. For example, the reader application 108 may enable the reader to select a currently un-highlighted portion of the text, and in response provide a feedback control enabling the user to provide feedback regarding the selected portion. In this scenario, the reader feedback data is generated based on user input to the feedback controls 304.

Figure 7:
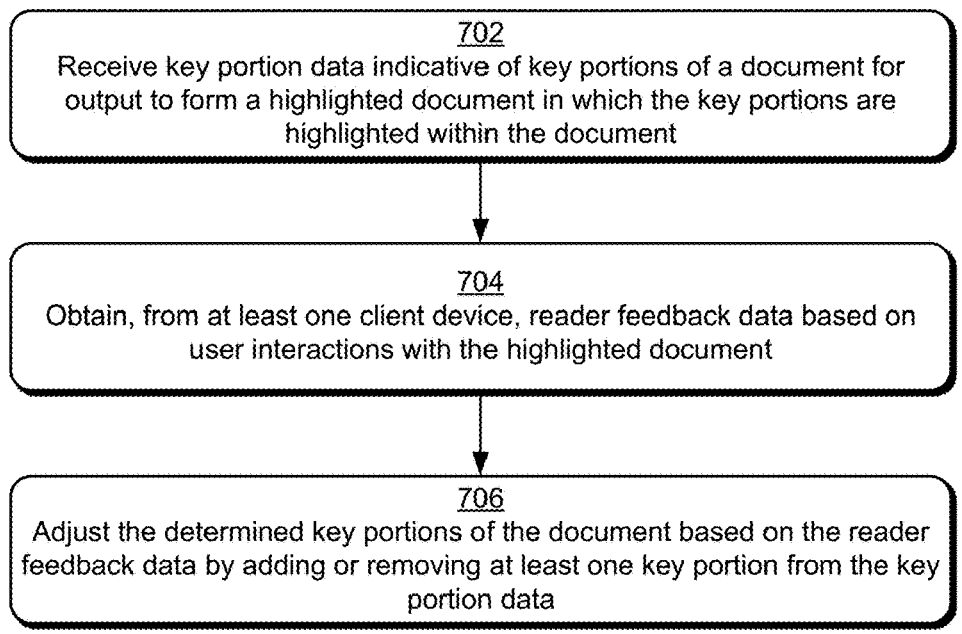
FIG. 7 depicts an example procedure in which key portion data indicative of key portions of text within a document is modified based on reader feedback data.

FIG. 7 depicts an example procedure 700 in which key portion data indicative of key portions of text within a document is modified based on reader feedback data.

Key portion data indicative of key portions of a document is received. The key portion data is usable to generate a highlighted document in which the key portions are highlighted within the document (block 702). By way of example, key portion data 114 indicative of key portions 204 of a document 112 is received from a storage 118 of the document highlighting system 102. The key portion data 114 may include identifiers or pointer to various sentences, phrases, or words within the document 112 which are determined to be key portions 204 by the summarization model 116. In some cases, the key portion data 114 may include additional data usable to form the highlighted document. For example, the key portion data may include an indication of the importance score associated with each key portion which can be used to display a highlight overlay with additional emphasis over key portions with the highest importance to the document.

Reader feedback data based on user interactions with multiple instances of the highlighted document is obtained from at least one client device (block 704). For example, the key portion recognizer 104 obtains reader feedback data 124 from multiple instances of the reader application 108 implemented at various client devices 106. The reader feedback data 124 describes reader interactions with the highlighted document, such as the amount of time readers spend reading particular portions of the highlighted document, positive or negative feedback regarding the key portions highlighted within the document, or requests to identify particular portions of the document as a key portion, to name just a few.

The determined key portions of the document are adjusted based on the reader feedback data by adding or removing at least one key portion from the key portion data (block 706). By way of example, the adjustment module 122 adjusts the determined key portions 204 by biasing the output of the summarization model 116 with the reader feedback data 124 in order to cause the summarization model 116 to add or remove the determined key portions 204. In one or more implementations, the adjustment module 122 modifies the importance scores 208 of the candidate portions 206, which in turn affects the key portions 204 which are selected by the summarization filter 210. For example, if the reader feedback data 124 indicates that a number of readers find a candidate portion 206 to be important, then the importance score 208 for the candidate portion is increased which may cause the candidate portion to be selected as a key portion 204 by the summarization filter 210. Similarly, if the reader feedback data 124 indicates that a number of readers find a key portion 204 to be not important, then the importance score 208 for the candidate portion is decreased which may cause the summarization filter 210 to de-select the portion as a key portion. Thus, unlike conventional document summaries which are static, the described techniques dynamically modify the determined key portions in order to improve the accuracy and relevance of the determined key portions 204.

Having described example procedures in accordance with one or more implementations, consider now an example system and device that can be utilized to implement the various techniques described herein.

Example System and Device

Figure 8:
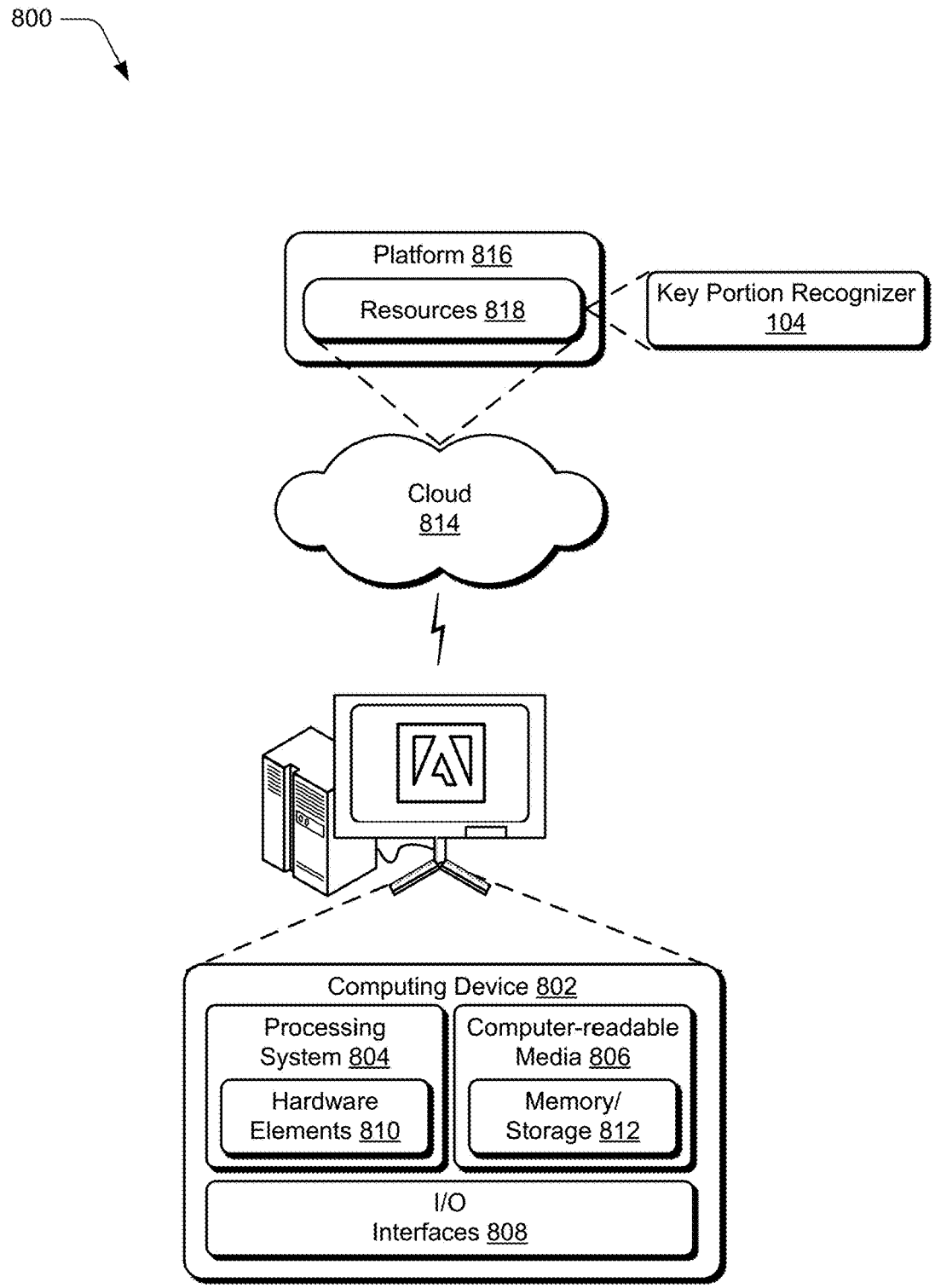
FIG. 8 illustrates an example system that includes an example computing device that is representative of one or more computing systems and/or devices that may implement the various techniques described herein.

FIG. 8 illustrates an example system generally at 800 that includes an example computing device 802 that is representative of one or more computing systems and/or devices that may implement the various techniques described herein. This is illustrated through inclusion of the key portion recognizer 104. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support reader interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to determine key portions of text within documents, a method implemented by a computing device, the method comprising:
   obtaining, by the computing device, digital content comprising a document having text;
   determining at least one key portion of the text of the document using summarization techniques;
   generating key portion data indicative of the determined at least one key portion;
   generating a highlighted document using the key portion data and the document having text, the highlighted document including the text of the document and additional digital content comprising highlight overlays displayed over or proximate to the determined at least one key portion of the text;
   obtaining reader feedback data, the reader feedback data generated at one or more client devices based on reader interactions with the highlighted document;
   generating modified key portion data using the summarization techniques and the reader feedback data; and
   generating a modified highlighted document using the modified key portion data.

2. A method as described in claim 1, wherein the generating modified key portion data comprises adding or removing at least one key portion of the text from the key portion data based on the reader feedback data.

3. A method as described in claim 1, wherein the reader feedback data comprises positive or negative reader feedback regarding at least one highlight overlay associated with a respective key portion of text within the highlighted document.

4. A method as described in claim 1, wherein the reader feedback data comprises a reader suggestion to highlight a currently un-highlighted portion of the text.

5. A method as described in claim 4, wherein the filtering comprises selecting a predetermined percentage of the candidate portions with the highest importance scores.

6. A method as described in claim 1, wherein the summarization techniques determine the at least one key portion of text by:
   identifying candidate portions of the text of the document;
   generating importance scores for each of the candidate portions of text, the importance score indicating a relative importance of each respective candidate portion to the document; and
   filtering the candidate portions to select a subset of the candidate portions as the determined key portions based on the importance score of each respective candidate portion.

7. A method as described in claim 1, wherein the key portions comprise sentences or phrases within the document with a high relative importance to the document based on a frequency of key terms within each respective key portion.

8. A method as described in claim 1, wherein the summarization techniques comprises machine learning extractive summarization techniques.

9. A method as described in claim 1, wherein the identified key portions comprise words, phrases, or sentences within the document.

10. A method as described in claim 1, wherein displaying the highlight overlays further comprises displaying at least two different types of highlight overlays for at least two respective key portions based on a relative importance of each respective key portion to the document.

11. A method as described in claim 1, further comprising applying one or more machine learning techniques to improve the summarization techniques based on the reader feedback data.

12. In a digital medium environment to highlight key portions of text within documents, a method implemented by a client device, the method comprising:
   obtaining a document having text and key portion data identifying at least one key portion of text within the document, the key portion data determined using summarization techniques;
   displaying digital content comprising the text of the document;
   displaying additional digital content comprising highlight overlays over or proximate to the identified at least one key portion of text within the document;
   monitoring reader interaction with the document;
   generating reader feedback data based on the reader interaction with the document;
   communicating the reader feedback data to a key portion recognizer to generate modified key portion data by adjusting the identified at least one key portion of the key portion data based on the reader feedback data and the summarization techniques; and
   generating a modified highlighted document using the modified key portion data.

13. A method as described in claim 12, wherein the summarization techniques comprise machine learning or rule-based summarization techniques, and wherein the key portion data identifies at least one key portion of the text corresponding to a summary of the document.

14. A method as described in claim 12, further comprising:

displaying, proximate at least one of the highlight overlays, a selectable feedback control;

receiving reader input to the selectable feedback control, the reader input providing positive or negative feedback regarding the corresponding key portion identified by the highlight overlay; and generating reader feedback data based on the reader input to the selectable feedback control.

15. A method as described in claim 12, further comprising:

receiving a reader suggestion to highlight a currently un-highlighted portion of the document; and generating reader feedback data based on the reader suggestion.

16. A method as described in claim 12, further comprising:

receiving reader input to filter the highlight overlays based on at least one topic of the document; and filtering the displayed highlight overlays by removing the display of highlight overlays which do not correspond to the at least one topic.

17. A method as described in claim 12, further comprising:

receiving a reader query;

processing the reader query using natural language processing techniques to determine at least one topic of the reader query; and filtering the displayed highlight overlays to display only highlight overlays corresponding to the at least one topic of the reader query.

18. A method as described in claim 12, further comprising displaying at least one user interface element to indicate relative amounts of time readers spend reading various areas of the document.

19. A system implemented in a digital medium environment to adjust key portions of documents based on reader feedback data, the system comprising:

at least one processor;

memory having stored thereon computer-readable instructions that are executable by the processor to implement a key portion recognizer to perform operations comprising:

receiving key portion data indicative of key portions of a document, the key portion data usable to generate a highlighted document in which the key portions are highlighted within the document, the key portions determined using summarization techniques;

obtaining reader feedback data from at least one client device, the reader feedback data generated based on reader interactions with the highlighted document;

generating modified key portion data by adjusting the key portions of the document based on the reader feedback data and the summarization techniques, the adjusting comprising adding or removing at least one identified key portion from the key portion data; and generating a modified highlighted document using the modified key portion data.

20. A system as described in claim 19, wherein the operations further comprising applying one or more machine learning techniques to improve the summarization techniques based on the reader feedback data.

* * * * *